United States Patent
Weber et al.

(10) Patent No.: US 8,017,536 B2
(45) Date of Patent: Sep. 13, 2011

(54) COMPONENT OF QUARTZ GLASS FOR USE IN SEMICONDUCTOR MANUFACTURE AND METHOD FOR PRODUCING THE SAME

(75) Inventors: Juergen Weber, Kleinostheim (DE); Tatsuhiro Sato, Fukushima (JP); Ralf Schneider, Bruchkoebel (DE); Achim Hofmann, Frankfurt (DE); Christian Gebauer, Tokyo (JP)

(73) Assignees: Heraeus Quarzglas GmbH & Co. KG, Hanau (DE); Shin-Etsu Quartz Products Co., Tokyo (JP)

( * ) Notice: Subject to any disclaimer, the term of this patent is extended or adjusted under 35 U.S.C. 154(b) by 133 days.

(21) Appl. No.: 12/226,861

(22) PCT Filed: Sep. 4, 2007

(86) PCT No.: PCT/EP2007/059217
§ 371 (c)(1),
(2), (4) Date: Oct. 30, 2008

(87) PCT Pub. No.: WO2008/031742
PCT Pub. Date: Mar. 20, 2008

(65) Prior Publication Data
US 2009/0163344 A1 Jun. 25, 2009

(30) Foreign Application Priority Data
Sep. 13, 2006 (DE) .......................... 10 2006 043 738

(51) Int. Cl.
C03C 3/06 (2006.01)
C03B 19/06 (2006.01)
C03B 19/00 (2006.01)

(52) U.S. Cl. .............. 501/54; 65/17.4; 65/17.5; 65/17.6
(58) Field of Classification Search .................... 501/53, 501/54; 65/17.3, 17.4, 17.5, 17.6, 421, 422
See application file for complete search history.

(56) References Cited

U.S. PATENT DOCUMENTS
5,192,351 A 3/1993 Mathur et al.
(Continued)

FOREIGN PATENT DOCUMENTS
JP 2003292337 10/2003

OTHER PUBLICATIONS
espacenet English language abstract for JP 62059536, Published Mar. 16, 1987.
(Continued)

*Primary Examiner* — Jerry A Lorengo
*Assistant Examiner* — Noah Wiese
(74) *Attorney, Agent, or Firm* — Tiajoloff and Kelly LLP

(57) ABSTRACT

The invention starts from a known component of quartz glass for use in semiconductor manufacture, which component at least in a near-surface region shows a co-doping of a first dopant and of a second oxidic dopant, said second dopant containing one or more rare-earth metals in a concentration of 0.1-3% by wt. each (based on the total mass of $SiO_2$ and dopant). Starting from this, to provide a quartz glass component for use in semiconductor manufacture in an environment with etching action, which component is distinguished by both high purity and high resistance to dry etching and avoids known drawbacks caused by co-doping with aluminum oxide, it is suggested according to the invention that the first dopant should be nitrogen and that the mean content of metastable hydroxyl groups of the quartz glass is less than 30 wtppm.

26 Claims, 1 Drawing Sheet

U.S. PATENT DOCUMENTS

Figure 1:
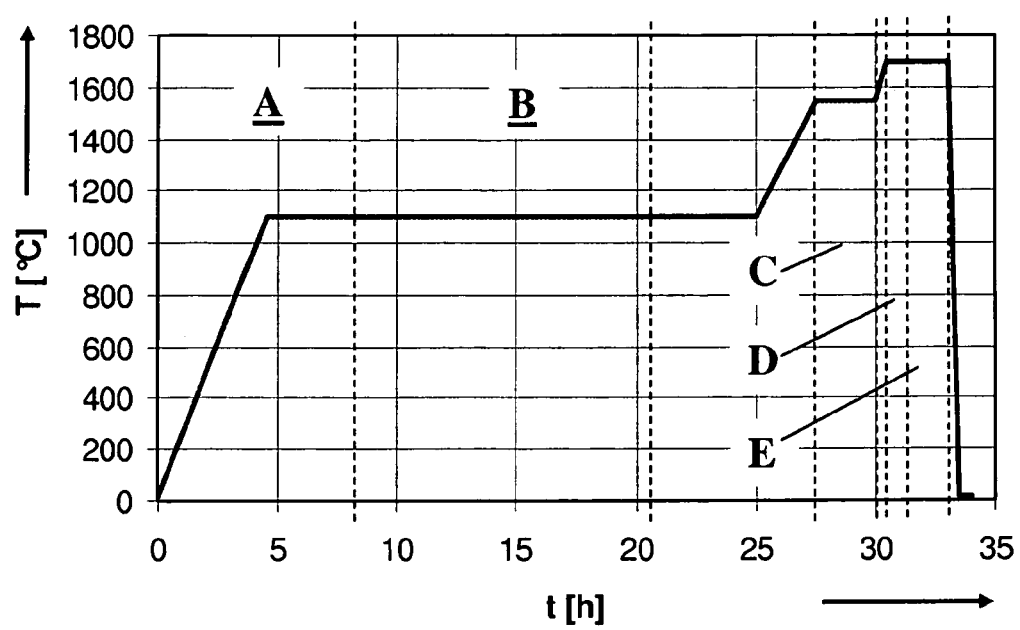

| | | | |
|---|---|---|---|
| 5,977,000 A * | 11/1999 | Sato et al. | 501/39 |
| 6,887,576 B2 * | 5/2005 | Sato et al. | 428/432 |
| 7,718,559 B2 * | 5/2010 | Yuan et al. | 501/54 |
| 7,749,930 B2 * | 7/2010 | Weber et al. | 501/54 |
| 2002/0076559 A1 * | 6/2002 | Sato et al. | 428/426 |
| 2004/0116269 A1 * | 6/2004 | Harada et al. | 501/54 |
| 2005/0272588 A1 * | 12/2005 | Sato et al. | 501/54 |

OTHER PUBLICATIONS espacenet English language abstract for JP 2003292337, Published Oct. 15, 2003.

* cited by examiner

COMPONENT OF QUARTZ GLASS FOR USE IN SEMICONDUCTOR MANUFACTURE AND METHOD FOR PRODUCING THE SAME

TECHNICAL BACKGROUND

The present invention relates to a component of quartz glass for use in semiconductor manufacture, which component at least in a near-surface region shows a co-doping of a first dopant and of a second dopant, the second dopant containing one or more rare-earth metal oxides in a concentration of 0.1-3% by wt. each (based on the total mass of $SiO_2$ and dopant).

Furthermore, the present invention relates to a method for producing such a component of quartz glass for use in semiconductor manufacture according to any one of the preceding claims, the method comprising providing $SiO_2$ raw material in particulate form, providing the $SiO_2$ raw material with a second dopant comprising one or more rare-earth metal oxides in a concentration of 0.1-3% by wt. each (based on the total mass of $SiO_2$ and dopant), and sintering or melting the $SiO_2$ raw material provided with the second dopant to obtain a quartz glass blank.

Yield and electrical operative behavior of semiconductor devices essentially depend on the extent to which semiconductor fabrication succeeds in preventing contamination of the semiconductor material caused by impurities acting as "semiconductor poisons". Contamination of the semiconductor material is e.g. caused by the apparatuses used in the fabrication process. On account of the chemical resistance of quartz glass to a great number of substances used in the fabrication process and on account of its relatively high thermal stability, apparatuses of such types often consist of quartz glass. Therefore, high demands are made on the purity of quartz glass. Therefore, the apparatuses are more and more provided with specifically cleaned or treated layers, or synthetically produced quartz glass is used that is distinguished by high purity.

A jig of the above-mentioned type is known from JP 10-114532 A. The document describes a so-called "single wafer jig" of synthetic quartz glass which is distinguished by a low content of the impurities Fe, Cu, Cr and Ni, each being less than 10 ppb, and by a hydroxyl group content in the range between 100 ppm and 1000 ppm.

In this respect the known quartz glass jig is well suited for use in semiconductor manufacturing processes. In plasma etch processes in which the semiconductor substrates (wafers) are subjected to gases and plasmas having an etching effect, e.g. $CF_4$, $CHF_3$, $C_2F_6$, $C_3F_8$, $NF_3$ or $SF_6$, a further problem is however that the quartz glass is slowly corroded due to the reaction between $SiO_2$ and fluorine. $SiO_2$ is removed in this process and the surface gets worn in the end or changed so much that the quartz glass jig must be replaced.

It is known that the dry etching resistance can be improved by doping the quartz glass, for instance, with oxides of rare-earth elements, such as Y, La, Ce, Nd, Sm, and Gd. A significant effect, however, requires a high concentration of said dopants, which may lead to precipitations, phase separation and crystallization.

To avoid such situations, US 2005/0272588 A1, which discloses a quartz glass component and a method according to the above-mentioned type, suggests a co-doping of rare-earth metal oxide as the second dopant with an element of group 3B of the periodic table as the first dopant, and here particularly aluminum oxide. A maximum concentration of 2% by wt. is indicated for each of the second dopants, and a total dopant concentration ranging from 0.1 to 20% by wt.

Moreover, this document suggests several procedures for producing a correspondingly doped quartz glass blank, wherein according to a preferred method $SiO_2$ raw material in particulate form is mixed with powder-like oxides of the dopants and the mixture is sintered in a quartz glass tube under a negative pressure.

However, it has been found that although such a co-doping with aluminum oxide may achieve an improved solubility of the additional dopant (apart from aluminum oxide), and thereby increase the dry etching resistance of the quartz glass, at least some of said dopant combinations may entail unexpected drawbacks. For instance, a discoloration of the quartz glass that is not desired for some applications is observed in the combination of Al and Nd, and the combination of Al and Y may result in a specific particle formation during use of the quartz glass in a plasma etch process with fluorine-containing etching gas.

OBJECT OF THE INVENTION

It is therefore the object of the present invention to provide a quartz glass component for use in semiconductor manufacture in an environment with an etching action, which component is distinguished by both high purity and high resistance to dry etching and avoids the said drawbacks of a co-doping with aluminum oxide.

Moreover, it is the object of the present invention to provide a method for producing such a quartz glass.

As for the quartz glass component, this object, starting from the above-mentioned component, is achieved according to the invention in that the first dopant is nitrogen and in that the quartz glass has a mean content of metastable hydroxyl groups of less than 30 wtppm.

It has been found that the discoloration or particle formation observed with the use of aluminum oxide as the first dopant is due to a reaction of fluorine-containing etching gas with aluminum. In this reaction aluminum fluorides are formed that may lead to discolorations or precipitations or to a crystallization of the quartz glass.

On the other hand, aluminum oxide (hereinafter also abbreviated as "Al") exhibits vis-à-vis the rare-earth metals an action promoting the solubility of said metals, which cannot easily be dispensed with. Surprisingly, it has been found that nitrogen dissolved or chemically bound in quartz glass shows a similar action promoting the solubility of rare-earth metal as does Al and that, therefore, nitrogen can replace the aluminum oxide in this respect fully or partly.

Therefore, according to the invention the quartz glass of the component according to the invention contains, in addition to one or more rare-earth metal oxides as the second dopant, nitrogen as the first dopant which replaces the formerly used aluminum in part or preferably altogether.

This yields a dry etching resistance of a similarly high degree without discolorations or particle formation being observed in the use of the quartz glass component of the invention in plasma etch processes in combination with fluorine-containing etching gas.

The near-surface area is primarily decisive for the dry etching resistance of the quartz glass component according to the invention. Therefore, the above and the following explanations primarily refer with respect to the quartz glass to a near-surface layer of the component with a depth of at least 50 µm, said layer encompassing the whole quartz glass component, if necessary.

Furthermore, the quartz glass according to the invention has a mean content of metastable hydroxyl groups of less than 30 wtppm.

Within the meaning of this invention the OH group content that will escape after bake-out of a quartz glass component with a thickness of 10 mm (diffusion length≦5 mm) when the bake-out process takes place at a temperature of 1040° C. for a period of 48 hours and with inert gas purging shall be defined as the content of metastable OH groups.

The content of metastable OH groups follows from the difference of the hydroxyl group content before and after the above-described bake-out, by measurement of the IR absorption according to the method of D. M. Dodd et al. "Optical Determinations of OH in Fused Silica", (1966), page 3911. The content of metastable OH groups will at any rate be smaller than the indicated upper limit if the total hydroxyl group content of the quartz glass is below said upper limit.

A low content of metastable hydroxyl groups results in two effects.

First, it has been found that the etch behavior of quartz glass is determined by its hydroxyl group content. However, it has also been found that this dependence is not unequivocally correlated with the total hydroxyl group content of the quartz glass, but that only the chemically not firmly bound metastable hydroxyl groups are critical in this respect. The lower the content of metastable hydroxyl groups (hereinafter also called metastable "OH groups"), the better is the etch resistance of the quartz glass to fluorine-containing substances. This effect can be explained by the fact that metastable OH groups can be more easily protonated than the Si—O—Si groups of the quartz glass network. In the quartz glass network, OH groups protonated by the acid attack represent leaving groups that can be easily substituted by a nucleophilic attack of the fluoride anion. This means that the more metastable hydroxyl groups are present in the quartz glass structure, the faster is the decomposition of the quartz glass network. The reaction that takes place in the etching process can be roughly described as follows:

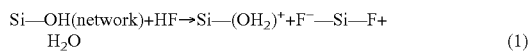

$$\text{Si—OH(network)} + \text{HF} \rightarrow \text{Si—(OH}_2)^+ + \text{F}^- \text{—Si—F} + \text{H}_2\text{O} \tag{1}$$

The effect on the etch stability of the quartz glass, however, will only significantly be noticed in the case of a metastable hydroxyl group content of less than 30 wtppm.

Second, the process for establishing a low content of metastable hydroxyl groups comprises a heating treatment of the quartz glass. Metastable hydroxyl groups are escaping during that heating treatment and leaving thereby sites of non-saturated Si-atoms. In following nitrogen doping treatment nitrogen atoms may combine with such sites resulting in a stable Si—N bonding. Therefore, a previous homogenous distribution of metastable hydroxyl groups facilitates the establishment of a homogenous distribution of nitrogen doping, provided that the metastable hydroxyl groups are removed prior to the nitrogen doping.

It has turned out to be useful when the mean nitrogen content is at least 30 wtppm, preferably at least 100 wtppm.

With nitrogen contents of less than 30 wtppm only a small effect is achieved with respect to an improved solubility of the rare-earth metal oxide, so that an additional significant amount of aluminum is additionally needed as the first dopant. Nitrogen contents above 100 wtppm may lead to the formation of bubbles in the quartz glass during heating.

The nitrogen content is measured by means of a gas analysis method known as "hot carrier gas extraction". An exactly weighed-in sample amount is heated up in a graphite crucible to a very high degree (3200° C. at the most), and the nitrogen gas released in this process is sensed by means of thermal conductivity measurement cells. The detection limit of this method is below 1 wtppm for nitrogen.

In a first preferred embodiment of the component of the invention, the quartz glass is fused from naturally occurring $SiO_2$ raw material.

The quartz glass fused from naturally occurring raw material is less expensive than synthetically produced quartz glass. However, during fusion attention must be paid that the amount of hydroxyl groups introduced into the quartz glass is as small as possible, or that these groups can still be removed at least at a later time.

In an alternative and equally preferred embodiment of the component according to the invention, the quartz glass is fused from synthetically produced $SiO_2$, the mean content of metastable hydroxyl groups being less than 1 wtppm.

Hydrogen-free synthesis methods for producing synthetic quartz glass with an extremely low content of hydroxyl groups are generally known. Plasma-supported oxidation and deposition of $SiO_2$ in a hydrogen-free atmosphere shall here be mentioned by way of example. Hydroxyl group contents in the ppb range as are required for optical waveguide applications can be attained with such methods. The quartz glass produced in this way is however very expensive and therefore not suited for mass application in semiconductor fabrication.

As a rule, synthetic quartz glass is produced by way of the so-called flame hydrolysis method from silicon-containing start substances by using deposition burners based on oxyhydrogen gas. Large amounts of hydroxyl groups are here introduced into the quartz glass. These groups can subsequently be removed relatively easily in a two-stage process with an intermediate product in the form of a porous $SiO_2$ body (soot body), for instance by a dehydration treatment using halogens.

However, it has now been found that the dehydration of porous $SiO_2$ bodies in halogen-containing atmosphere leads either to weak network bonds or to a low density of the quartz glass, and that both effects are accompanied by a low etch stability of the resulting quartz glass.

An acceptable etch resistance is however accomplished in synthetic quartz glass at any rate if the mean content of metastable hydroxyl groups is less than 1 wtppm and the quartz glass is doped with nitrogen.

The co-doping of nitrogen and rare-earth metal according to the invention has turned out to be particularly advantageous if the rare-earth metal is Y and/or Nd.

Doping of the quartz glass with Y or Nd significantly enhances the dry etching resistance to fluorine-containing etching gases. Thanks to the co-doping with nitrogen no discolorations or particle formations are observed with a corresponding use of the quartz glass component.

The co-doping with nitrogen replaces the dopant aluminum oxide fully or at least in part. Bubbles may form at high nitrogen concentrations. A supporting action by additional co-doping with small amounts of aluminum oxide might be helpful as long as discolorations or particle formations do not occur or do not occur to a significant and objectionable degree. Moreover, due to manufacture, high alumina content is often accompanied by high hydroxyl group content because the Al doped quartz glass is normally fused by flame fusion methods using a hydrogencontaining burner flame to avoid separations. A high hydroxyl-group content has a disadvantageous effect on the resistance to etching, which shall be explained in more detail further below.

Advantageously, the alumina doping action is therefore kept as small as possible, and an embodiment of the component of the invention is preferred in which the quartz glass contains aluminum oxide in an amount of less than 1% by wt., preferably less than 0.5% by wt., particularly preferably less than 0.1% by wt.

Furthermore, it has turned out to be advantageous when the quartz glass has a fictive temperature below 1250° C., its viscosity being at least $10^{13}$ dPa·s at a temperature of 1200° C.

It has been found that the etch behavior of quartz glass is essentially determined by its glass structure. A high etch resistance can only be achieved if strained bonds and bonding angles are avoided in the quartz glass network. One parameter for characterizing the specific glass structure is the "fictive temperature". The state of order of the "frozen-in" glass network is described thereby. A higher fictive temperature of the quartz glass is accompanied by a lower state of order of the glass structure and a greater deviation from the energetically most advantageous arrangement. In quartz glass having a fictive temperature above 1300° C., the energetically more disadvantageous state of the glass structure is clearly noticeable in the form of a higher etch rate.

A standard measurement method for determining the fictive temperature by way of a measurement of the Raman scattering intensity at a wave number of about 606 $cm^{-1}$ is described in "Ch. Pfleiderer et al.; The UV-induced 210 nm absorption band in fused silica with different thermal history and stoichiometry; Journal of NonCryst. Solids 159 (1993), pp. 143-145".

Moreover, it has been found that the etch resistance of the quartz glass significantly depends on its viscosity. A high viscosity is accompanied by a high etch resistance. Therefore, the quartz glass according to the invention is also distinguished by a high viscosity which is at least $10^{13}$ dPa·s at a temperature of 1200° C. As is generally known, nitrogen doping of the quartz glass effects an increase in viscosity and thus also an increased etch resistance. Attention must here be paid that the temperature resistance of the quartz glass in the present invention does not play a significant role, for the quartz glass component is not exposed to any high temperatures when used in conformity with its intended purpose. The standard temperature loads are between room temperature and about 300° C.

It has turned out to be particularly advantageous when the quartz glass has a content of fluorine of less than 50 wtppm and of chlorine of less than 60 wtppm.

Fluorine and chlorine doping operations reduce the density of quartz glass, thereby impairing etch resistance. Moreover, fluorine or chlorine can be easily protonated or substituted in the compounds of silicon, thereby accelerating the decomposition of the network structure. In the case of natural quartz glass, fluorine or chlorine is often quantitatively analyzed by analysis methods such as ICP-AES (inductive coupled plasma atomic (optical) emission spectroscopy) or ICP-AAS (inductive coupled plasma atomic (optical) absorption spectroscopy), the detection limit of fluorine being about 50 wtppm and that of chlorine about 60 wtppm. The real concentrations of said substances in natural quartz glass may, however, be distinctly below said detection limits, depending on the pretreatment of the raw material. In synthetic quartz glass, Raman spectroscopy is used for the quantitative analysis of fluorine or chlorine. The contents of said substances are to be quantified in the ppb range by means of Raman spectroscopy.

So-called network converters, such as alkali ions, loosen the network structure of quartz glass already at a low concentration to a considerable extent and reduce the etch resistance thereof. Therefore, it has turned out to be advantageous when the content of Na and K in the quartz glass is not more than 500 wtppb.

As for the method, the above-mentioned object starting from the above-indicated method is achieved according to the invention in that the quartz glass blank is provided with a first dopant in the form of nitrogen in that sintering or melting is carried out in a nitrogen-containing overpressure atmosphere by way of gas pressure sintering.

The method according to the invention serves the manufacture of a quartz glass component of the invention with the above-explained properties and effects using naturally occurring or synthetically produced $SiO_2$ raw material in particulate form, $SiO_2$ being doped either with the second dopant or with particulate powder of the dopant. The doped $SiO_2$ blank is sintered or fused to obtain a quartz glass blank, as is otherwise also known from the prior art.

The development of the prior art according to the invention is based on the measure that the $SiO_2$ raw material pre-doped with the second dopant or the sintered or fused quartz glass blank is additionally provided with a first dopant in the form of nitrogen during sintering or melting in a nitrogen-containing overpressure atmosphere by way of gas pressure sintering.

The nitrogen is here introduced either via the gas phase and/or in the form of nitrogen-containing chemical compounds that are admixed to the powder to be molten or sintered and released during heating of the nitrogen.

Due to the overpressure during gas pressure sintering an efficient nitrogen doping is accomplished that contributes to an increase in viscosity at high temperatures of application and to an increased etch resistance of the quartz glass, as has been described above, and whereby particularly a higher solubility of the second dopant, namely of rare-earth metal oxide, is accomplished in the quartz glass. Especially, the gas pressure sintering comprises a heat treatment step that is suitable to remove metastable hydroxyl groups from the quartz glass, in order to establish a low content of metastable hydroxyl groups below 30 wtppm, preferable below 5 wtppm and especially preferred below 1 wtppm before nitrogen doping under pressure. This is contributing to an establishment of a homogenous distribution of nitrogen doping as explained above.

The quartz glass component according to the invention is obtained by way of a surface treatment from the blank produced in this way. The surface treatment comprises, for instance, a mechanical, thermal or chemical aftertreatment of the blank by doping, vitrifying, grinding, cutting or polishing, also flame polishing. Moreover, the further processing may include an annealing step or plastic forming steps.

Advantageous developments of the method according to the invention become apparent from the dependent claims. Insofar as developments of the method indicated in the dependent claims copy the features mentioned in dependent claims with respect to the quartz glass component according to the invention, reference is made to the above comments regarding the corresponding component claims for supplementary explanation. The developments of the method according to the invention as outlined in the remaining dependent claims shall be explained in more detail in the following.

Preferably, gas pressure sintering comprises the following method steps:
(a) heating the $SiO_2$ raw material provided with the second dopant to a temperature ranging between 1000° C. and 1500° C. while applying and maintaining a negative pressure,
(b) holding the $SiO_2$ raw material at the temperature in a nitrogen atmosphere at an overpressure in the range between 2 bar and 20 bar for a holding period of at least 30 min, (c) melting the $SiO_2$ raw material at a temperature in the range between 1550° C. and 1800° C. at a negative pressure and for a melting period of at least 30 min while forming the quartz glass blank, and (d) cooling the quartz glass blank.

In this embodiment of the method according to the invention a two-stage temperature treatment is intended. In the first stage, the $SiO_2$ raw material is freed from gases and other volatile impurities (especially metastable hydroxyl groups), whereby dense sintering being here avoided. Therefore, this temperature treatment is restricted to a maximum temperature of 1500° C. Since the sintering process is determined by diffusion processes that are dependent on both time and temperature, it is understandable that heating up for a short period of time does not lead to dense sintering although the temperature is above 1500° C. This kind of treatment—at relatively high temperature and low pressure (vacuum)—is especially suitable for removing metastable hydroxyl groups, thereby leaving non-saturated bonds which can be saturated easily by nitrogen atoms in the subsequent nitrogen doping treatment.

The incorporation of nitrogen into quartz glass may easily lead to the formation of bubbles. It has been found that a substantial nitrogen doping action can be accomplished without bubble formation by means of the above-mentioned procedure. Co-doping with nitrogen replaces the dopant aluminum oxide fully or at least in part, as has been explained further above.

A mean nitrogen content of at least 30 wtppm, preferably at least 100 wtppm, is thereby set during gas pressure sintering in the quartz glass of the quartz glass blank.

In a particularly preferred variant of the method, the quartz glass blank is treated after melting according to method step (c) in a nitrogen-containing atmosphere and at a temperature in the range between 1550° C. and 1800° C. at an overpressure in the range between 2 bar and 20 bar for duration of at least 30 min.

The overpressure treatment at a high temperature corresponds to a hot pressing of the sintered quartz glass. Gas bubbles entrapped in the quartz glass after melting are dissolved or reduced in size by this treatment, which can also be carried out in an atmosphere other than a nitrogen-containing atmosphere—though this is less preferred.

It has turned out to be advantageous when during gas pressure sintering the quartz glass of the quartz glass blank is set to a fictive temperature of 1250° C. or less.

The advantage of the setting of a fictive quartz glass temperature that is as low as possible has already been explained further above with respect to the dry etching resistance of the quartz glass. A temperature treatment is here needed for which a slow cooling of the quartz glass is typical in the temperature range between 1450° C. and 1100° C., so that structural rearrangements of the glass structure are made possible. For reasons of high productivity and energy saving measures this cooling for setting the fictive temperature is performed during cooling in the gas pressure sintering process.

It has turned out to be advantageous when the dehydration measure includes a melting or sintering of the $SiO_2$ raw material in a graphite-containing mold.

The carbon of the graphite-containing mold has a dehydrating impact on quartz glass and therefore removes hydroxyl groups very efficiently. A dehydration measure comprising a melting or sintering of the $SiO_2$ raw material in a water-free atmosphere or in vacuum has an equal impact.

In addition to a nitriding of the $SiO_2$ raw material or the quartz glass blank during gas pressure sintering, a preloading of the raw material with nitrogen has turned out to be useful in that prior to melting or sintering the raw material is heated in an ammonia-containing atmosphere.

It has been found that this prenitriding in quartz glass of natural raw materials works optimally at a nitriding temperature in the range between 1080° C. and 1120° C. and in synthetic quartz glass at a nitriding temperature in the range between 1130° C. and 1170° C.

As a rule, the treatment of the blank into its final dimensions takes place through mechanical removal. The smoothing operation of the mechanically treated surface can be carried out by chemical etching or by way of a fire polish.

It has been found advantageous to set during process step (a) the mean content of metastable hydroxyl groups of the quartz glass below 30 wtppm, preferably below 5 wtppm and most preferred below 1 wtppm.

A low content of metastable hydroxyl groups prior to the nitrogen doping treatment (according to process step (c)) facilitates an homogeneous nitrogen doping.

SPECIFIC EMBODIMENT

The invention shall now be described in more detail with reference to an embodiment and a drawing, in which as the sole FIGURE FIG. 1 shows a temperature and pressure profile during gas pressure sintering for producing a component according to the invention.

EXAMPLE 1

Naturally occurring particulate quartz crystal is used as the starting material and purified by hot chlorination at a high temperature (about 1050° C.). The purified natural $SiO_2$ granules have an $Al_2O_3$ content of about 15 wtppm.

A mass of 99 kg of said $SiO_2$ granules is homogeneously mixed with 1 kg $Y_2O_3$ (1% by wt. of the total mass) by means of a ball mill with a wall and grinding bodies of quartz glass.

The powder mixture is subsequently put into a hollow cylindrical graphite mold and vitrified in a sintering furnace by gas pressure sintering. The temperature and pressure profile during gas pressure sintering is shown in FIG. 1. The treatment duration "t" is plotted in hours on the x-axis, and the treatment temperature in ° C. on the y-axis.

The powder mixture is first slowly heated to 1100° C. During a first phase A lasting for nine hours, which comprises heating up and the first three hours of the holding period at this temperature, a vacuum (<5 mbar) is maintained in the sintering furnace, interrupted by inert gas purging operations. During that phase the mean content of metastable hydroxyl groups of the quartz glass is set below 1 wtppm. During a subsequent second phase B a nitrogen overpressure of 12 bar is produced and, interrupted by a gas exchange of the furnace atmosphere, maintained for a total of 12 hours before the furnace temperature is raised under vacuum to 1550° C. At this temperature the powder mixture is sintered for a duration of 2.5 h and in vacuum (phase C) and then heated up to a temperature of 1700° C. and vitrified in this process to obtain a block of transparent quartz glass. Vitrification is first carried out in vacuum (1 h, phase D) and then in a nitrogen atmosphere at a pressure of 12 bar (2.5 h, phase E).

Subsequent cooling of the quartz glass block to a temperature of 400° C. is carried out at a cooling rate of 2° C./min, wherein the overpressure is further maintained. Free cooling to room temperature is then carried out.

It is in this way that a mean nitrogen concentration of about 100 wtppm is set in the quartz glass block, as well as a fictive temperature of 1190° C. The quartz glass is without any metastable hydroxyl groups. Further properties become apparent from column 2 of Table 1.

reference to Example 1. The properties of the resulting quartz glass follow from column 3 of Table 1.

TABLE 1

| Properties | Example | | | | |
|---|---|---|---|---|---|
| | 1 | 2 | 3 | 4 | S |
| Metastable OH groups [wtppm] | <1 | <1 | <1 | <1 | 25 |
| Mean F content [wtppm] | <50 | <50 | <50 | <50 | <50 |
| Mean Cl content [wtppm] | <60 | <60 | <60 | <60 | <60 |
| $Y_2O_3$ content [wt %] | 1 | 0 | 1 | 0 | 0 |
| $Nd_2O_3$ content [wtppm] | 0 | 1 | 0 | 1 | 0 |
| Na/K content [wtppm] | 0.05/0.08 | 0.05/0.08 | 0.05/0.08 | 0.05/0.08 | 0.05/0.1 |
| $Al_2O_3$ content [wtppm] | 15 | 15 | 15 | 15 | 15 |
| Mean nitrogen content [wtppm] | 150 | 150 | 80 | 80 | 0 |
| Viscosity [dPa·s] | 1E13.6 | 1E13.7 | 1E13.5 | 1E13.6 | 1E13.5 |
| Fictive temperature [degree C.] | 1190 | 1200 | 1170 | 1180 | 1148 |
| Measured value M for dry etching behavior | 0.30 | 0.32 | 0.40 | 0.42 | 1.00 |

The resulting quartz glass is colorless and without bubbles, and it is characterized by a comparatively high dry etching resistance. For producing a single wafer jig for the processing of semiconductor wafers, a ring is separated therefrom, ground and then etched in HF solution.

The dry etching behavior was determined for all quartz glass qualities listed in Table 1 as follows:

Corresponding samples were subjected to a standard etch process in a plasma etch chamber together with a reference sample. The reference sample is a thermally grown $SiO_2$ which forms in dry etching processes by deposition of silicon and subsequent oxidation into silica. To determine an etch depth, a respective portion of the sample was covered with an etch-resistant film. The dry etching behavior is here defined as the ratio of the depths of the etch steps obtained after the etch process in the sample and in the reference sample. The dimensionless measured value determined in this way was again related to the measured value indicating the dry etching behavior of the former standard material. This standard material consists of a quartz glass of natural raw material that is produced in a multistage process that comprises drawing of a quartz glass strand from the melt and several forming processes. Nitrogen is not added to the quartz glass as a dopant, and it is therefore substantially free from nitrogen. In the above Table 1 such a quartz glass is listed as comparative sample "S".

The measured value determined in this way for the dry etching behavior of the respective quartz glass samples is indicated in the last line of Table 1. The smaller the measured value, the better is the dry etching behavior of the respective quartz glass. Table 1 also shows the respective chemical composition of the quartz glasses and their specific treatments and the resulting changes in the measured value.

EXAMPLE 2

Naturally occurring particulate quartz crystal is used as the starting material and cleaned, as has been described above with reference to Example 1.

A mass of 99 kg of these $SiO_2$ granules is homogeneously mixed with 1 kg $Nd_2O_3$ by means of a ball mill having a wall and grinding bodies of quartz glass.

The powder mixture is put into a hollow cylindrical graphite mold and vitrified in a sintering furnace by gas pressure sintering, the temperature and pressure profile of which is shown in FIG. 1 and explained in more detail above with reference to Example 1. The properties of the resulting quartz glass follow from column 3 of Table 1.

EXAMPLE 3

Example 3 corresponds to the above Example 1, except for the measure that the sintered powder mixture was vitrified at a temperature of 1700° C. first of all in vacuum (one hour) and thereafter for only one hour in a nitrogen atmosphere at a pressure of 12 bar (shortened phase E in comparison with Examples 1 and 2). This yielded a reduced mean nitrogen content of 80 wtppm. The other properties of the quartz glass produced in this way become apparent from the fifth column of Table 1.

EXAMPLE 4

Example 4 corresponds to the above Example 2 with the exception that the sintered powder mixture is vitrified at a temperature of 1700° C. first in vacuum (one hour) and thereafter only for one hour (phase-E shortened in comparison with Examples 1 and 2) in a nitrogen atmosphere at a pressure of 12 bar. This yielded a reduced mean nitrogen content of 80 wtppm. The other properties of the quartz glass produced in this way are apparent from the last column of Table 1.

The invention claimed is:

1. A component for use in semiconductor manufacture, said component comprising quartz glass, having a near-surface region having a co-doping of a first dopant and a second oxidic dopant, said second dopant comprising one or more rare-earth metals each in a concentration of 0.1-3% by weight, based on the total mass of $SiO_2$ and said first and second dopants, and wherein the first dopant is nitrogen and the quartz glass has a mean content of metastable hydroxyl groups of less than 30 wtppm.

2. The component according to claim 1, wherein the mean nitrogen content is at least 30 wtppm.

3. The component according to claim 1, wherein the mean content of metastable hydroxyl groups is less than 5 wtppm.

4. The component according to claim 3, wherein the quartz glass is fused from naturally occurring $SiO_2$ raw material.

5. The component according to claim 1, wherein the quartz glass is fused from synthetically produced $SiO_2$ and the mean content of metastable hydroxyl groups is less than 1 wtppm.

6. The component according to claim 1, wherein the rare-earth metal is Y and/or Nd.

7. The component according to claim 1, wherein the quartz glass contains aluminum oxide in an amount or less than 1% by wt.

8. The component according to claim 1, wherein the quartz glass has a fictive temperature below 1250'C, and a viscosity that is at least $10^{13}$ dPa·s at a temperature of 1200° C.

9. The component according to claim 1, wherein the quartz glass has a content of fluorine of less than 50 wtppm.

10. The component according to claim 1, wherein the quartz glass has a content of chlorine of less than 60 wtppm.

11. The component according to claim 1, wherein the quartz glass has a respective content of Na and K therein that is less than 500 wtppb.

12. A method for producing a component of quartz glass, comprising quartz glass having a near-surface region having a co-doping of a first dopant and a second oxidic dopant, said second dopant comprising one or more rare-earth metals each in a concentration of 0.1-3% by weight, based on the total mass of $SiO_2$ and said first and second dopants, and wherein the first dopant is nitrogen and the quartz glass has a mean content of metastable hydroxyl groups of less than 30 wtppm, said method comprising:

providing $SiO_2$ raw material in particulate form, the $SiO_2$ raw material being provided with a rare-earth-metal second dopant comprising one or more rare-earth metal oxides each in a concentration of 0.1-3% by wt. based on the total mass of $SiO_2$ and said first and second dopants, and sintering or melting the $SiO_2$ raw material provided with the second dopant so as to obtain a quartz glass blank, wherein the sintering or melting of the quartz glass blank is carried out in a nitrogen-containing atmosphere by gas pressure sintering so that that the quartz glass blank is provided with another dopant in the form of nitrogen.

13. A method for producing a component of quartz glass for use in semiconductor manufacture, said component comprising quartz glass, said quartz glass having a near-surface region having a co-dopant of a first dopant and of a second oxidic dopant, said second dopant containing one or more rare-earth metals in a concentration of 0.1-3% by wt., each based on the total mass of $SiO_2$ and said first and second dopants and wherein the first dopant is nitrogen and the quartz glass has a mean content of metastable hydroxyl groups of less than 30 wtppm, said method comprising:

providing $SiO_2$ raw material in particulate form, providing the $SiO_2$ raw material with the second dopant comprising one or more rare-earth metal oxides in a concentration of 0.1-3% by wt, each based on the total mass of $SiO_2$ and said first and second dopants, and sintering or melting the $SiO_2$ raw material provided with the second dopant so as to obtain a quartz glass blank, wherein the quartz glass blank is provided with the first dopant in the form of nitrogen by carrying out sintering or melting thereof in a nitrogen-containing atmosphere by way of gas pressure sintering: and wherein the gas pressure sintering includes the following method steps:

(a) heating the $SiO_2$ raw material provided with the second dopant to a temperature ranging between 1000° C. and 1500° C. while applying and maintaining a negative pressure, (b) holding the $SiO_2$ raw material at the temperature in a nitrogen atmosphere at an overpressure in the range between 2 bar and 20 bar for a holding period of at least 30 min, (c) melting the $SiO_2$ raw material at a temperature in the range between 1550° C. and 1800° C. at a negative pressure and for a melting period of at least 30 min while forming the quartz glass blank, and (d) cooling the quartz glass blank.

14. The method according to claim 13, wherein after melting according to method step (c) the quartz glass blank is treated in a nitrogen-containing atmosphere and at a temperature in the range between 1550° C. and 1800° C. at an overpressure in the range between 2 bar and 20 bar for a period of at least 30 min.

15. The method according to claim 12, wherein a mean nitrogen content of at least 30 wtppm, is set during gas pressure sintering in the quartz glass of the quartz glass blank.

16. The method according to claim 12, wherein the rare-earth metal is Y and/or Nd.

17. The method according to claim 12, wherein during gas pressure sintering the quartz glass of the quartz glass blank is set to a fictive temperature of 1250° C. or less.

18. The method according to claim 12, wherein gas pressure sintering comprises melting or sintering of the $SiO_2$ raw material in a graphite-containing mold.

19. The method according to claim 12, wherein the raw material is healed in an ammonia-containing atmosphere prior to melting or sintering.

20. The method according to claim 13, wherein during process step (a) the mean content of metastable hydroxyl groups of the quartz glass is set below 30 wtpprn.

21. The method according to claim 12, wherein a mean nitrogen content of at least 100 wtppm is set during gas pressure sintering in the quartz glass of the quartz glass blank.

22. The method according to claim 13, wherein during process step (a) the mean content of metastable hydroxyl groups of the quartz glass is set below 5 wtppm.

23. The method according to claim 13, wherein during process step (a) the mean content of metastable hydroxyl groups of the quartz glass is set below 1 wtppm.

24. The component according to claim 1, wherein the mean nitrogen content is at least 100 wtppm.

25. The component according to claim 1, wherein the quartz glass contains aluminum oxide in an amount less than 0.5% by wt.

26. The component according to claim 1, wherein the quartz glass contains aluminum oxide in an amount less than 0.1% by wt.

* * * * *